(12) United States Patent
Gernold

(10) Patent No.: US 8,010,484 B2
(45) Date of Patent: Aug. 30, 2011

(54) GENERATING DATA SUBSCRIPTIONS BASED ON APPLICATION DATA

(75) Inventor: Peter Gernold, Schriescheim (DE)

(73) Assignee: SAP Aktiengesellschaft, Walldorf (DE)

( * ) Notice: Subject to any disclaimer, the term of this patent is extended or adjusted under 35 U.S.C. 154(b) by 1490 days.

(21) Appl. No.: 10/784,196

(22) Filed: Feb. 24, 2004

(65) Prior Publication Data

US 2004/0254937 A1 Dec. 16, 2004

Related U.S. Application Data

(60) Provisional application No. 60/478,349, filed on Jun. 16, 2003.

(51) Int. Cl.
*G06F 7/00* (2006.01)
(52) U.S. Cl. ........................ 707/609; 707/687
(58) Field of Classification Search .................... 707/10, 707/7, 104.1, 100, 609, 687, 627, 628, 632, 707/999.102
See application file for complete search history.

(56) References Cited

U.S. PATENT DOCUMENTS

| | | | |
|---|---|---|---|
| 4,253,157 A * | 2/1981 | Kirschner et al. ..................... 1/1 |
| 5,870,605 A * | 2/1999 | Bracho et al. .................. 719/318 |
| 5,884,324 A * | 3/1999 | Cheng et al. .................. 707/201 |
| 5,919,247 A * | 7/1999 | Van Hoff et al. .............. 709/217 |
| 6,256,676 B1 | 7/2001 | Taylor et al. |
| 6,289,337 B1 | 9/2001 | Davies et al. |
| 6,405,191 B1 * | 6/2002 | Bhatt et al. ..................... 707/694 |
| 6,446,092 B1 * | 9/2002 | Sutter ................................... 1/1 |
| 6,502,093 B1 * | 12/2002 | Bhatt et al. ............................ 1/1 |
| 6,505,200 B1 * | 1/2003 | Ims et al. ........................... 707/8 |
| 6,643,682 B1 * | 11/2003 | Todd et al. ..................... 709/202 |
| 6,757,896 B1 * | 6/2004 | Cohen et al. .................. 718/100 |
| 7,539,763 B2 * | 5/2009 | Toyota et al. ................. 709/229 |
| 7,545,805 B2 * | 6/2009 | Huang et al. .................. 370/389 |
| 7,551,629 B2 * | 6/2009 | Chen et al. .................... 370/401 |
| 2003/0154193 A1 * | 8/2003 | Rosenblum ........................ 707/3 |
| 2004/0002958 A1 * | 1/2004 | Seshadri et al. ................. 707/3 |
| 2004/0002988 A1 * | 1/2004 | Seshadri et al. ............. 707/102 |
| 2004/0044729 A1 | 3/2004 | Foerg et al. |
| 2004/0210597 A1 * | 10/2004 | Wanish ........................ 707/102 |

OTHER PUBLICATIONS

Office Action dated Dec. 13, 2007 re: U.S. Appl. No. 10/784,848; 16 pages.

(Continued)

*Primary Examiner* — Hosain T Alam
*Assistant Examiner* — Eliyah S Harper
(74) *Attorney, Agent, or Firm* — Fish & Richardson, P.C.

(57) ABSTRACT

Subscriptions to stored data for different computer systems and mobile devices are generated based on distribution criteria and application data to control what portions of particular types of data should go to a particular computer system or mobile computing device, each of which may be identified as a data site. The particular type of data may include a business object type or a publication in a publish-and-subscribe model of data replication. The distribution criteria may include an attribute of the type of data to be distributed, or may be based on a relationship of data with an employee that uses a data site or on a responsibility of an employee that uses a data site. The distribution criteria also may include a query executable against portions of the application data or other types of complex processing logic.

15 Claims, 8 Drawing Sheets

OTHER PUBLICATIONS

Chambers, B. et al, "Customer Relationship Management, The New Battlefield for Workflow," Document World, IMC, Amstelveen, NL, vol. 4, No. 4, Jul. 1999, XP009020464.

Erasala, N. et al, "Enterprise Application Integration in the Electronic Commerce World," Computer Standards & Interfaces, vol. 25, No. 2, May 2003, pp. 69-82, XP004418377.

Hill, J. et al, "Data Transformation: Key to Information Sharing," Gartner Group Strategic Analysis Report, Sep. 19, 1998, pp. 1-60, XP 002223428.

Mitschang, B., "Data Propagation: A Necessity for CSCW in Design," Seventh International Conference on CSCW in Design, Sep. 25, 2002, pp. 4-9, XP010615655.

Seshadri, P. et al, "SQLServer for Windows CE—A Database Engine for Mobile and Embedded Platforms," Data Engineering, 2000, pp. 642-644, XP010378761.

SAP CRM 3.1, "The Administration Console user manual," Walldorf, Germany: SAP AG, Dec. 2002, pp. 1-92.

* cited by examiner

GENERATING DATA SUBSCRIPTIONS BASED ON APPLICATION DATA

CROSS REFERENCE TO RELATED APPLICATIONS

This application claims priority from U.S. Provisional Application No. 60/478,349, titled "Generation of Subscriptions" and filed Jun. 16, 2003, which is incorporated by reference in its entirety.

TECHNICAL FIELD

This description relates to using a computer system to manage the distribution of application data.

BACKGROUND

A database, such as a relational database, an object-oriented database, or another type of data management system, may be used for the administration of data processed by a computer system running one or more application programs or systems. Examples of application programs or systems include an enterprise resource management system, a customer relationship management system, a human resources management system, a supply chain management system, and a financial management system. In some cases, portions of data used for an application system on one computer system (which may be referred to as a central computer) may need to be sent to another computer system or computing device (collectively, computer) that stores a copy of the application data for use by one or more users that access the application system using the receiving computer. The receiving computer may be referred to as having partially replicated data because the computer receives and stores only a portion of the data stored by the central computer system. The receiving computer also may be referred to as a node of the central computer system or as a data site or a computer site of the application (collectively "site" or "data site").

To manage the distribution of data from a central computer system to multiple computers having partially replicated data, replication messages containing the data may be sent from the central computer system to the appropriate data sites based on the data needs of the user or users accessing the application through the data site. Particular replication messages may be sent to one or more particular data sites based on a data distribution program that uses manually created data distribution information to control the routing of replication messages to data sites. Using a publish-and-subscribe model, replication messages are routed based on manually created data distribution information that includes publications and subscriptions. In one implementation of the model, an application "publishes" data such that the data is made available to be accessed, such as by packaging the data into a replication message and routes the message to another application or data source based on a "subscription" to the publication of data.

SUMMARY

Subscriptions to stored data for different computer systems and mobile devices are generated based on distribution criteria and application data to control what portions of particular types of data should go to a particular computer system or mobile computing device, each of which may be identified as a data site. Such subscriptions to stored data may be referred to as a data subscription or merely as a subscription.

Generally, the invention uses a computer to determine, based on information in an application and a distribution criterion for a particular type of data, the data sites to which new or modified application data is to be propagated. An efficient method of distributing information to employees who need to use the information may be useful, particularly in a context in which remotely located employees use a distributed network of computers, including computing systems and mobile computing devices. It may be desirable to ensure that each employee receives information that is necessary to the employee's work. Also, it may be desirable to limit unnecessary information from reaching employees to avoid compromising confidentiality and to eliminate the waste of time and computer and network resources, for example. This endeavor is complicated by a large number of employees, many of whom use a mobile device on which data is located and which needs to be maintained from a central database, another computing system, and/or other mobile devices.

One way to manage the distribution of data is through the use of subscriptions. Data changes, particularly changes to master data records, are propagated to multiple data sites through the use of messages from a central computer system to the other data sites. Based on the message, the data site updates the data stored on the data site. A data site identifies itself as a receiver of a particular type of data change message by "subscribing" to the publication of the type or types of data changes. Particular employees are associated with each data site, and so, data updates are provided to a data site for use by the employees that use the data site. In many cases, such as when an employee uses a mobile computing device that stores application data (rather than using the mobile computing device to access data stored on a network computer), a data site may be used by only one employee, which may result in the need to generate subscriptions for many data sites. Particularly in such a case, the ability to automatically generate subscriptions, based on application data, to particular kinds of data changes may be advantageous.

In one general aspect, generating data subscriptions involves accessing information identifying a type of data to be distributed to data sites and accessing information identifying a distribution criterion that defines the basis upon which the type of data is to be distributed to the data sites. Application data of various data types is accessed. Data subscriptions are generated in a network of distributed computer systems operating an application program having the application data of the various data types. Each data subscription 1) is generated based on the type of data to be distributed to data sites and the distribution criterion and 2) identifies a portion of the application data to be distributed to one or more of the data sites.

Implementations may include one or more of the following features. For example, information related to data sites wherein the data site information includes attributes and attribute values associated with a particular data site may be accessed. A particular data site may be associated with a particular data subscription based on the data site information being related to the portion of application data to be distributed in the particular data subscription. The type of data to be distributed to data sites may include a business object type or a publication.

The distribution criterion may include an attribute of the type of data to be distributed, and the generation of data subscriptions may be based on the attribute of the type of data to be distributed to data sites. The distribution criterion also may be based on a relationship of a portion of the application data with an employee that uses a data site, and the generation of data subscriptions may be based on the relationship of the portion of the application data with the employee that uses the data site.

In another general aspect, a system for generating data subscriptions may include a central system and distributed systems. The central system has a central database storing application data of various data types for an application program and stores data subscriptions to receive portions of the application data. The distributed systems have local databases of which at least some local databases include different portions of the application data from the central database. The data subscriptions for types of application program data are automatically generated based only on (1) the application data and (2) a distribution criteria for a type of application program data.

Implementations may include one or more of the features noted above and the following feature. The central system also may store assignments of data subscriptions to distributed systems such that each assignment identifies a particular data subscription and a particular distributed system that is to receive a portion of the type of application program data that corresponds to the distribution criteria for the type of application program data included in the data subscription.

Implementations of the techniques discussed above may include a method or process, a system or apparatus, or computer software on a computer-accessible medium. The details of one or more implementations of the invention are set forth in the accompanying drawings and the description below. Other features, objects, and advantages of the invention will be apparent from the description and drawings, and from the claims.

DETAILED DESCRIPTION

Figure 1:
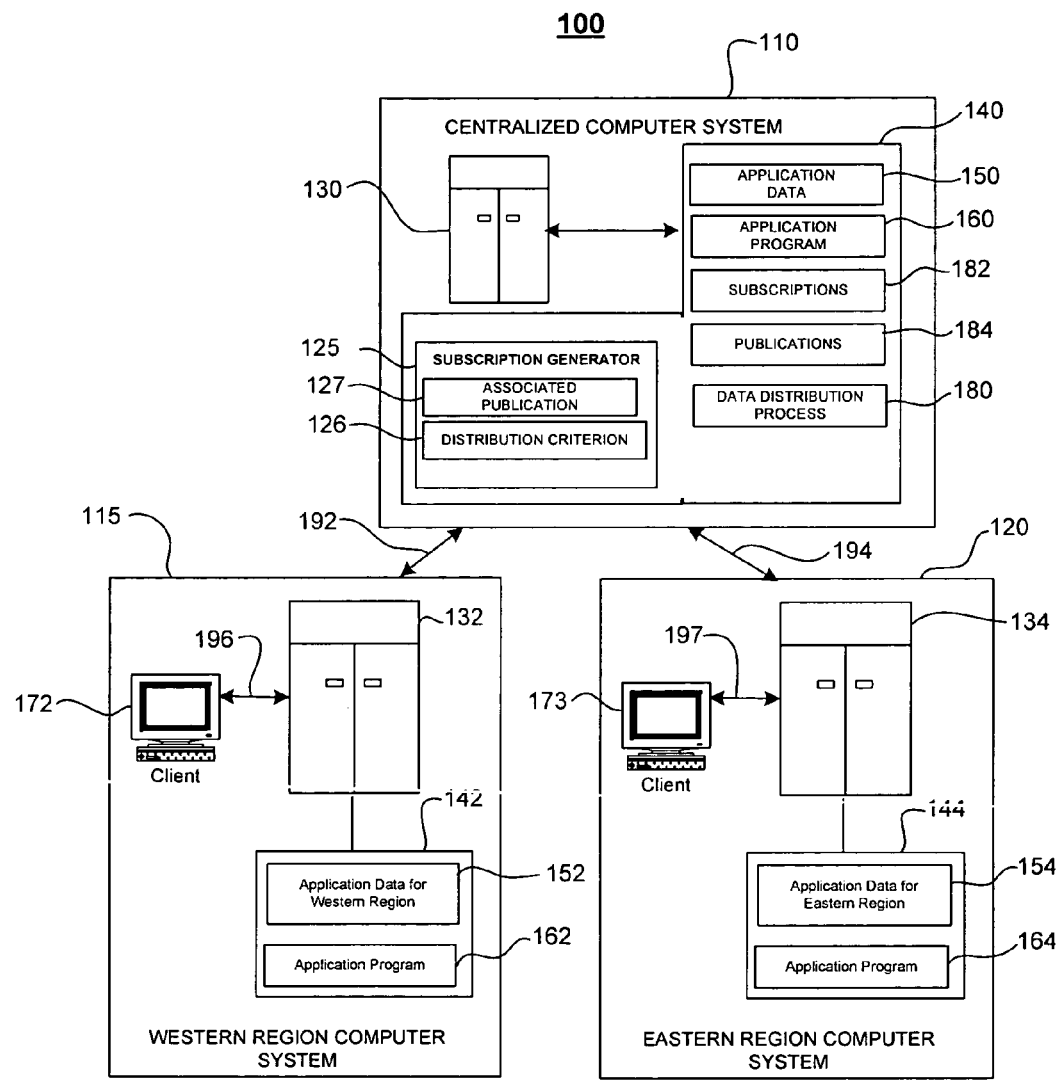
FIG. 1 is a block diagram of a system incorporating various aspects of the invention.

FIG. 1 shows a diagram of a system 100 of networked computers, including a centralized computer system 110 and two distributed, partially replicated computer systems 115 and 120 for operating a particular business application, such as a customer relationship management system, a human resources system, a supply chain management system or a financial management system. In general, the centralized computer system 110 receives a data change from one of the distributed computer systems 115 and 120 and distributes the data changes to the other of the distributed computer systems 115 or 120. The centralized computer system 110 distributes the data to one of the distributed systems 115 or 120 based on a "subscription" of the distributed system 115 or 120 to the type of data being changed. Because identifying the computer systems to receive various types of data changes may be burdensome to a system administrator or other type of user (particularly, when there are a large number of partially replicated computer systems to receive data), the centralized computer system 110 includes a subscription generator 125 (or other type of executable software) capable of generating, based on application information and a distribution criterion 126, subscriptions to data changes for various types of application data identified by an association 127 of a particular publication in publication's 184.

More specifically, as is conventional, each computer system 110, 115, or 120 includes a server 130, 132, or 134 connected to a data storage device 140, 142, or 144 associated with each server. Each of the data storage devices 140, 142, and 144 includes application data 150, 152, or 154 and executable instructions 160, 162, or 164 for an application program. Each of the computer systems 115 or 120 also includes clients 172 or 173, each of which may be, for example, a desktop computer, a laptop computer, a workstation or other type of computing device capable of being used by a user of the application. For brevity, FIG. 1 shows only one client 172 or 173 for each of the computer systems 115 and 120.

The centralized computer system 110 has a centralized data repository that includes application data 150 used by all users of all computer systems 110, 115 or 120 that operate the application. The application data 150 may be stored in a centralized data repository.

In contrast, each of the distributed computer systems 115 or 120 includes application data 152 or 154 respectively that is a subset of the centralized application data 150 and includes only a portion of the application data 150 on the distributed computer system 115 or 120. The portion of data stored on each of the distributed computer systems 115 or 120 is based on the data needed by the users that access the application through the computer system 115 or 120. The application data 150, 152, and 154 includes multiple application entities, each of which has a collection of data attribute values. Each entity may be stored as a row in a relational database table, an object instance in an object-oriented database, data in an extensible mark-up language (XML) file, or a record in a data file. In some implementations, the application data 152 or 154 may contain data that is not included in the application data 150.

The centralized computer system 110 includes a data distribution process 180 that includes executable instructions for distributing portions of the data 150 to each of the computer systems 115 or 120, as appropriate, based on the users that accesses the computer system 115 or 120 through a client 172 or 173.

The data distribution process 180 uses the subscriptions 182 stored in the data storage device 140 to determine to which computer systems 115 and/or 120 each particular data modification should be sent. Subscriptions 182 for a publication (that is, a particular type of data) to be sent are generated, based on application data 150, by the subscription generator 125. More particularly, for example, the subscription generator 125 identifies that a publication of sales order data (and included in publications 184) is to be distributed to computer systems 115 and/or 120 based on whether a sales order in application data 150 identifies the sales region as "Western" (in which case the sales order is provided to the Western Region Computer System 115) or "Eastern" (in which case the sales order is provided to the Easter Region Computer System 120). Examples of creating and using a subscription generator for generating subscriptions are described more fully in FIGS. 2A, 2B, and 3-7.

The ability to generate, based on application data, subscriptions for particular types of data (that is, "publications") may be useful. This may be particularly true where there are many different partially replicated data sites for which subscriptions to various kinds of data need to be created. A subscription generator may result in a reduction in the human effort to maintain the data distribution needed to support multiple partially replicated data sites.

The centralized computer system 110 also is capable of delivering and exchanging data with the distributed computer systems 115 and 120 through a wired or wireless communication pathway 192 and 194, respectively. Each computer system 110, 115 or 120 also is able to communicate with the clients 172 and 173, each of which is connected to a computer system 115 or 120 through a communication pathway 196 or 197.

The computer system 110, the partially replicated computer systems 115 and 120, and the clients 172 and 173 may be arranged to operate within or in concert with one or more other systems, such as, for example, one or more LANs ("Local Area Networks") and/or one or more WANs ("Wide Area Networks"). The client 172 or 173 may be a general-purpose computer that is capable of operating as a client of the application program (e.g., a desktop personal computer, a workstation, or a laptop computer running an application program), or a more special-purpose computer (e.g., a device specifically programmed to operate as a client of a particular application program).

In some implementations, the subscription generator 125 may use application data other than the application data 150 stored at the centralized computer system 110. In one example, the subscription generator 125 may use a portion of application data 152 and a portion of application data 154 to create subscriptions.

Figure 2A:
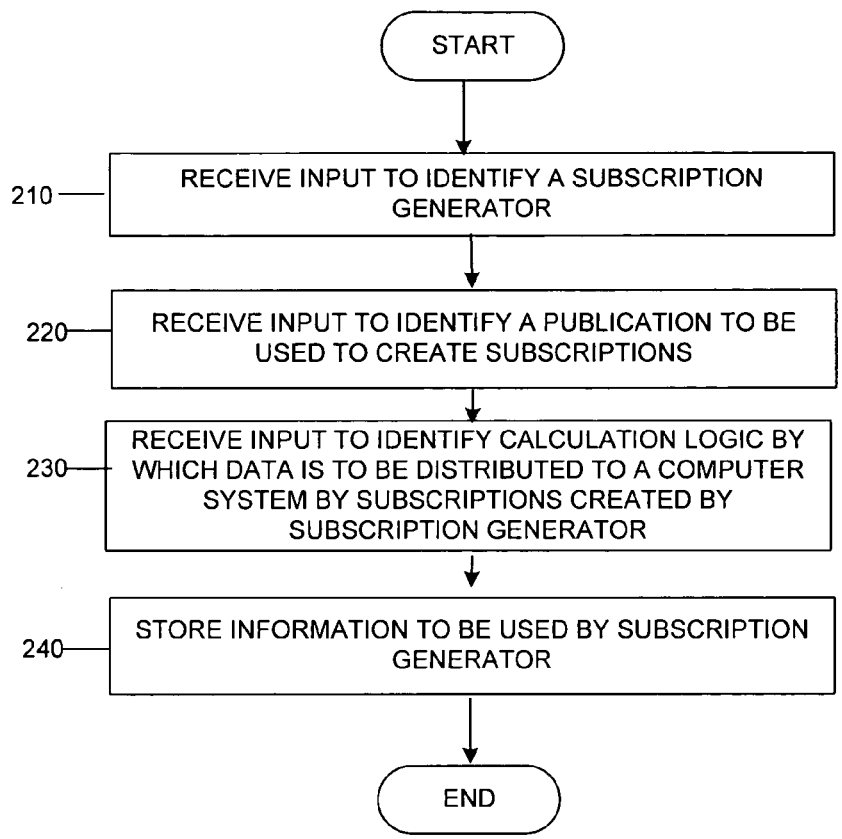
FIG. 2A is a flow chart illustrating a process for creating a subscription generator for managing the distribution of data to partially replicated data systems.

FIG. 2A illustrates a process 200A for creating a subscription generator for managing the distribution of data to partially replicated data systems. The process 200A may be performed by a processor on a computing system, such as centralized computer system 110 of FIG. 1. A system administrator or another type of user manually initiates and enters inputs for the process 200A. The process 200A of entering information for a subscription generator may be performed using a graphical user interface, and the graphical user interface may be referred to as a subscription agent.

The process 200A begins by receiving input to identify a subscription generator (step 210). Typically, the input includes a name or other type of identifier for the subscription generator to be created.

An input also is received that identifies a publication that identifies the type of data to be distributed and the identified publication is used by the subscription generator to create subscriptions to the publication (step 220). To accomplish this, for example, a user may select a publication from a list of predetermined publications. Each publication identifies a particular type of data capable of being distributed to other computer systems or other of data sites. Additionally or alternatively, to identify a publication, a user may directly enter a name or other type of identifier associated with a particular publication of data. Optionally, the received input may refer to a particular business document type and one or more data fields on which the publication is to be based. One example is a sales-order-by-country publication in which sales orders are the distributed based on the value of an attribute "country" in a sales order object. In another example, a sales-order-by-employee publication is distributed based on the employee who generated the sale.

As described previously, a publication identifies a type of data, or a combination of types of data (such as a sales order), for which subscriptions having particular values for the type of data are to be generated. Assignments of particular data sites are then made to each subscription. Middleware then may be used to send replication messages that distribute portions of the type of data (that is, for example, particular sales orders) to particular data sites based on the assignment of the particular data site to a particular subscription.

The processor receives an input to identify calculation logic by which data is to be distributed to a computer system by subscriptions created by the subscription generator (step 230). In other words, the calculation logic identifies the manner in which application data is used to generate subscriptions for the publication identified in step 220. In general, the calculation logic identifies distribution criteria by which the data type or types identified in the publication are to be distributed to one or more computer systems. The calculation logic may be in different forms. In one example of a form of calculation logic, the received calculation logic may be a distribution criterion that identifies a particular attribute (in contrast to a value of an attribute) of the data type or types that are to be used to identify data to be distributed. The attribute of application data used to identify data to be distributed may be referred to as a criterion attribute or a criteria data field. For example, a received input of calculation logic may identify that a sales order stored in one or more database tables is to be distributed based on the distribution criteria of the region in which the sale originated. The region, in this example, is an attribute for the sales order entity.

In other examples of different forms of calculation logic, the distribution criteria may be other than a particular attribute of the data type to be distributed. For example, data may be distributed based on a relationship of data entities to an employee that uses a particular computer system. For example, data for a particular sales order may be distributed based on the employee who is responsible for placing and delivering the sales order. The calculation logic in such a case may identify a sales order table from application data that identifies the responsible employee and a user configuration table that identifies the computer system that each employee uses. Thus, based on a portion of the application data, particular portions of data to be distributed to various computer systems can be identified.

In some implementations, calculation logic may identify a database query and the results of the database query then are used to generate subscriptions. For example, a row of a database table may indicate that a subscription for sales orders placed from the United States are to be assigned to a particular employee, whereas another row in the database table indicates that a subscription for orders placed from Germany are to be assigned to a different employee. In such a case, the calculation logic of a database query may identify the location of a sales order as the basis on which subscriptions are generated and assigned to responsible employees. More generally, an association between a value of the publication attribute (which may be referred to as a subscription value) and a particular employee may be identified as a result of a database query identified by calculation logic. Using the particular employee, the subscription generator then is able to identify the data site to which the employee is associated, and hence, assign the subscription to that data site.

In another example, calculation logic may define relationships between database tables (or other types of data structures). For example, a country field in a first table is related by a particular key value to a second table, which, in turn, is related to a third table in which employee key is found. The relationship between the tables identifies how to traverse multiple table structures that are needed to identify the information (here, employee key) is used to identify the data sites to which a subscription is to be assigned.

In yet another example, the calculation logic may be defined in a computer program (or other type of executable function or instructions) that identifies a collection of processing logic that is used to identify what data sites a subscription is to be assigned. More particularly, the executed computer program identifies subscription values for which employees are responsible. A computer program or function for the calculation logic may include, for example, how one data attribute or value is mapped to another data attribute or value. The computer program also may or include a data filter for identifying a portion of data to be used by the subscription generator (in contrast to using all of the data identified by the publication).

The use of a computer program or function to execute and define calculation logic may be advantageous to improve performance of a subscription generator when complex logic is involved. In addition, the use of a computer program or function to define and execute calculation logic may enable calculation logic to be used that otherwise may not be able to be defined, or may not be able to be easily defined, using a graphical user interface.

In yet another example of a form of calculation logic, calculation logic may be identified that links multiple criteria attributes to reduce the number of subscriptions generated for the multiple criteria attributes identified in calculation logic. More particularly, when more than one attribute is to be used to generate subscriptions to a publication, separate calculation logic may be defined for each criteria or attribute of the calculation logic.

Similarly, the multiple criteria attributes identified in the calculation logic may be linked for purposes of more efficiently generating subscriptions. In one example of linked criteria attributes, subscriptions are to be generated for a publication based on the application data appearing in Table 1 below. In this example, calculation logic is received that identifies the criteria attributes of "country" and "region." When the two criteria fields of "country" and "region" are linked in the calculation logic used to generate subscriptions for a publication, the subscription generator combines the two criteria attributes such that a subscription is only created for data types that have attribute values matching the values of both criteria attributes in the application data. In the example of Table 1, a subscription generator for which calculation logic links the two criteria attributes of "country" and "region" only generates two subscriptions for the data site to which the employee associated with the employee identifier 111 is assigned. In particular, one subscription is generated in which the criteria attribute of "country" is "United States" and the criteria attribute of "region" is "01" and a second subscription is generated in which the criteria attribute of "country" "Canada" and the criteria attribute of "region" is "03." In contrast, a subscription generator that did not link the two criteria attributes of "country" and "region" is less efficient and generates four subscriptions. One subscription is for the criteria attribute of "country" being the "United States" and of "region" being "01", a second subscription is for the criteria attribute of "country" being "Canada" and of "region" being "01", a third subscription is for the criteria attribute of "country" being "United States" and of "region" being "03" and the fourth subscription is for the criteria attribute of "country" being "Canada" and of "region" being "03." Thus, the use of linked criteria attributes in calculating logic enables a more precise definition of the subscriptions to be created by the subscription generator, which, in turn, may help reduce the number of subscriptions generated.

TABLE 1

| Country | Region | Employee Identifier |
|---------|--------|---------------------|
| United States | 01 | 111 |
| Canada | 03 | 111 |

The processor then stores information to be used by the subscription generator to enable the generation of subscriptions for publication identified in step 220 and based on the calculation logic identified in step 230 (step 240). By way of example, meta data may be stored in a subscription generator repository. The meta data identifies the settings (such as the identification of the subscription generator received in step 210, the identification of a publication received in step 220, and the calculation logic received in step 230) for each subscription generator. The meta data is made accessible to, and used by, a computer program for generating subscriptions based on application data.

In many cases, the same subscriptions may be generated based on application data and calculation logic of different forms.

Figure 2B:
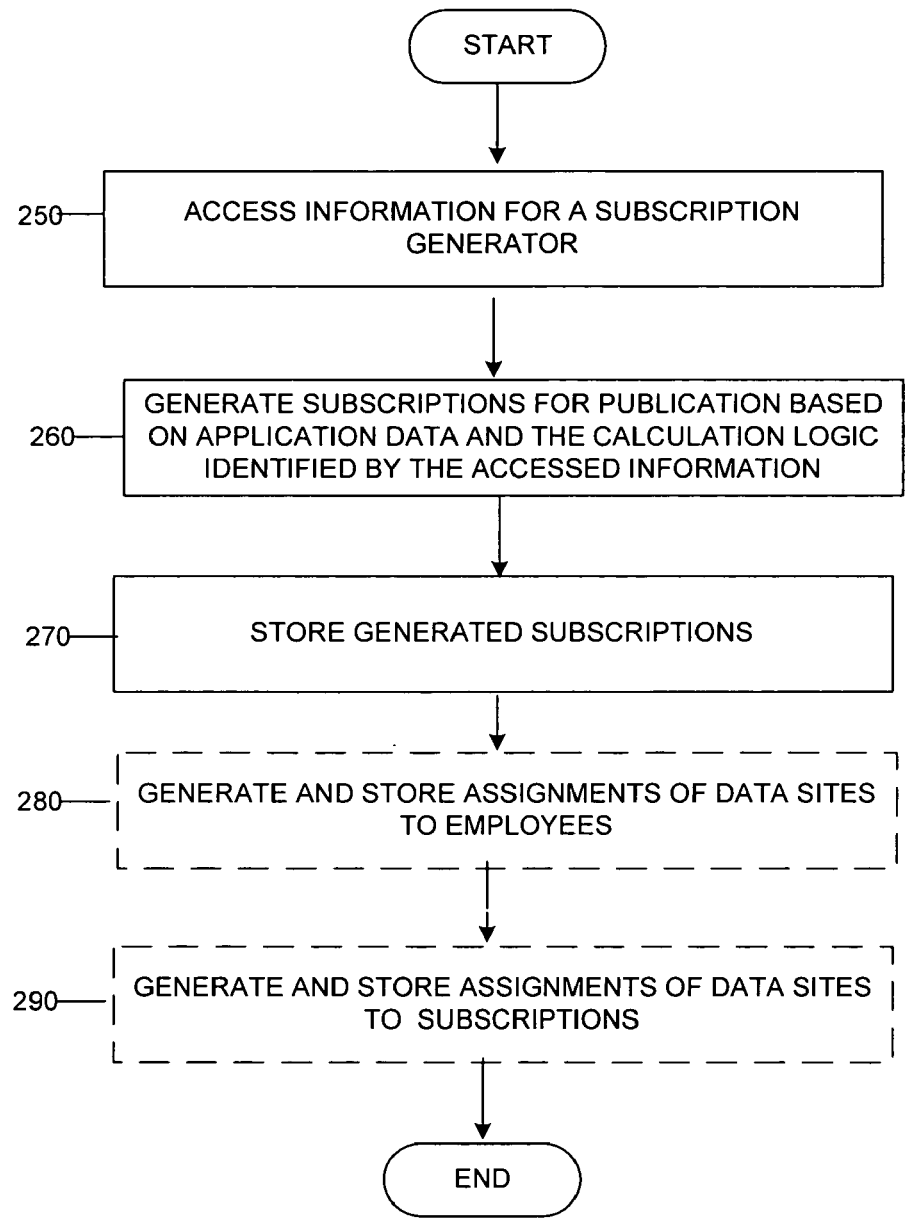
FIG. 2B is a flow chart illustrating a process for using a subscription generator for managing the distribution of data to partially replicated data systems.

FIG. 2B illustrates a process 200B for using a subscription generator for managing the distribution of data to partially replicated data systems. The process 200B may be performed by a processor on a computing system, such as centralized computer system 110 of FIG. 1. The processor is directed by a method, script or other type of computer program that includes executable instructions for performing the process 200B. An example of such a collection of executable instructions is the subscription generator 125 in FIG. 1. The process 200B may begin at a predetermined time and date, typically a recurring time and date. Additionally or alternatively, a system administrator or a another type of user may manually initiate the process 200B.

The processor accesses information for a subscription generator (step 250). In one example, the processor may access meta data associated with the subscription generator. In another example, the processor may execute a computer program for generating subscriptions that includes or accesses subscription information or receives parameters that identify subscription information to be used for generating subscriptions. Examples of parameters include a publication identifier and a criteria attribute to use to generate subscription to the publication based on application data.

The processor uses the accessed information to generate subscriptions for the publication identified in the information based on application data and the calculation logic identified in the accessed information (step 260). This may be accomplished by using the processor to execute the computer program identifying the calculation logic of the subscription generator. When executing, the subscription generator uses application data of an application program and the received distribution criteria of the calculation logic to generate subscriptions to receive particular portions of the application data, for example, as illustrated in FIG. 3.

Figure 3:
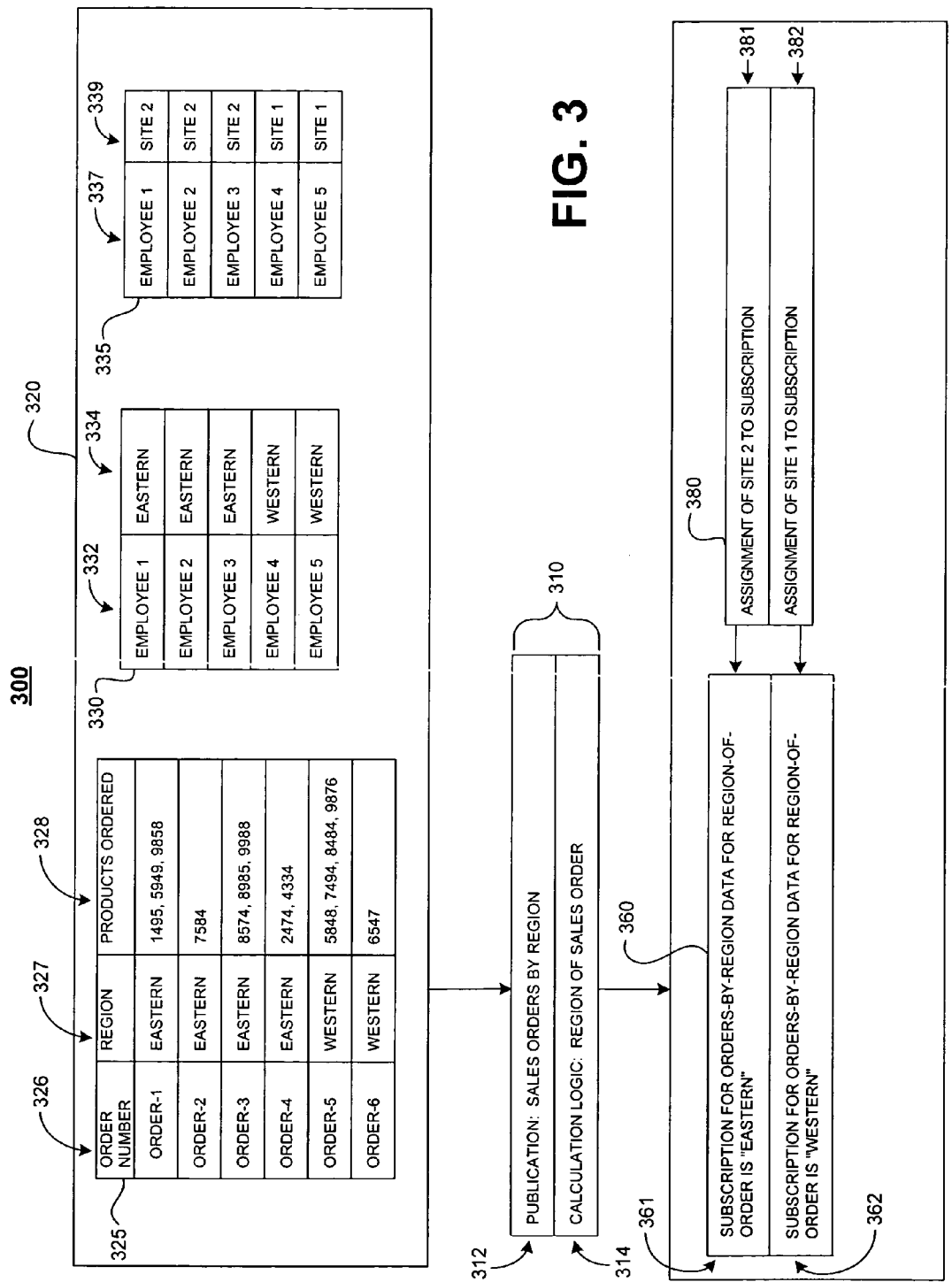
FIG. 3 is a diagram that shows an example of results of creating and using a subscription generator.

In the example of FIG. 3, a subscription generator is used for distributing sales orders that identifies a data type or types (here, sales orders). The subscription generator includes information 310 that identifies the publication 312 to be distributed. The information 310 also includes calculation logic 314 to be used to distribute the type of data identified by the publication 312. Here, the calculation logic 314 identifies that the sales orders are to be distributed based on the region 327 attributed in the sales order data 325.

The application data 320 includes sales order data 325 including attributes of order number 326, region 327 in which the sale occurred, and product numbers 328 of the products ordered. The application data 320 also includes region assignment data 330 that indicates the assignment of a particular employee 332 to a particular region 334, and site assignment data 335 that indicates the assignment of a particular employee 337 to a particular data site 339 that identifies which data site is used by the particular employee 337 to access application data 320 or a portion of the application data 320. In some implementations, site assignment data 335, or a portion thereof, also may be generated by a subscription generator.

More particularly, the subscription generator uses information 310 to generate subscriptions 360 for sales order data 325 based on the values of the region attribute 327. Here, the subscription generator uses information 310 to generate a subscription 361 for orders that have the region attribute 327 value of "Eastern" and another subscription 362 for orders that have the region attribute 327 value of "Western."

Referring again to FIG. 2B, the processor stores the generated subscriptions (step 270). In most cases, the generated subscriptions are stored in persistent storage for later use in managing the distribution of data. The processor also optionally creates and stores assignments of data sites to particular employees (step 280). As shown in FIG. 3, for example, the assignment data 335 may be created. For example, when an employee is not yet assigned to a data site, the processor may create a new data site and assign the employee to the newly created data site. This may be particularly useful when an employee uses a data site that is not shared with another employee, as may be the case when an employee uses a data site on a mobile computing device.

The processor optionally creates and stores, based on application data, assignments of particular data sites to the generated subscriptions (step 290). Based on an assignment to a particular subscription, a particular data site receives data of the type identified by the subscription. As shown in FIG. 3, for example, the processor uses information 310 to assign particular data sites to each of the subscriptions 361 or 362 based on the application data 320. More particularly, the processor creates assignments 380 of data sites to particular subscriptions 361 or 362 based on the association of a data site 339 to a region 334 through the indirect association of an employee 332 with a region 334 and an employee 337 with a data site 339. An assignment 381 is created to the subscription 361 for site 2 because of the association of employees assigned to the "Eastern" region 334 with the site 2, as shown by the values of data site 339. An assignment 382 is created to the subscription 362 for site 1 because of the association of employees assignment to the "Western" region 334 with the site 1, as shown by the values of data site 339.

Figure 4:
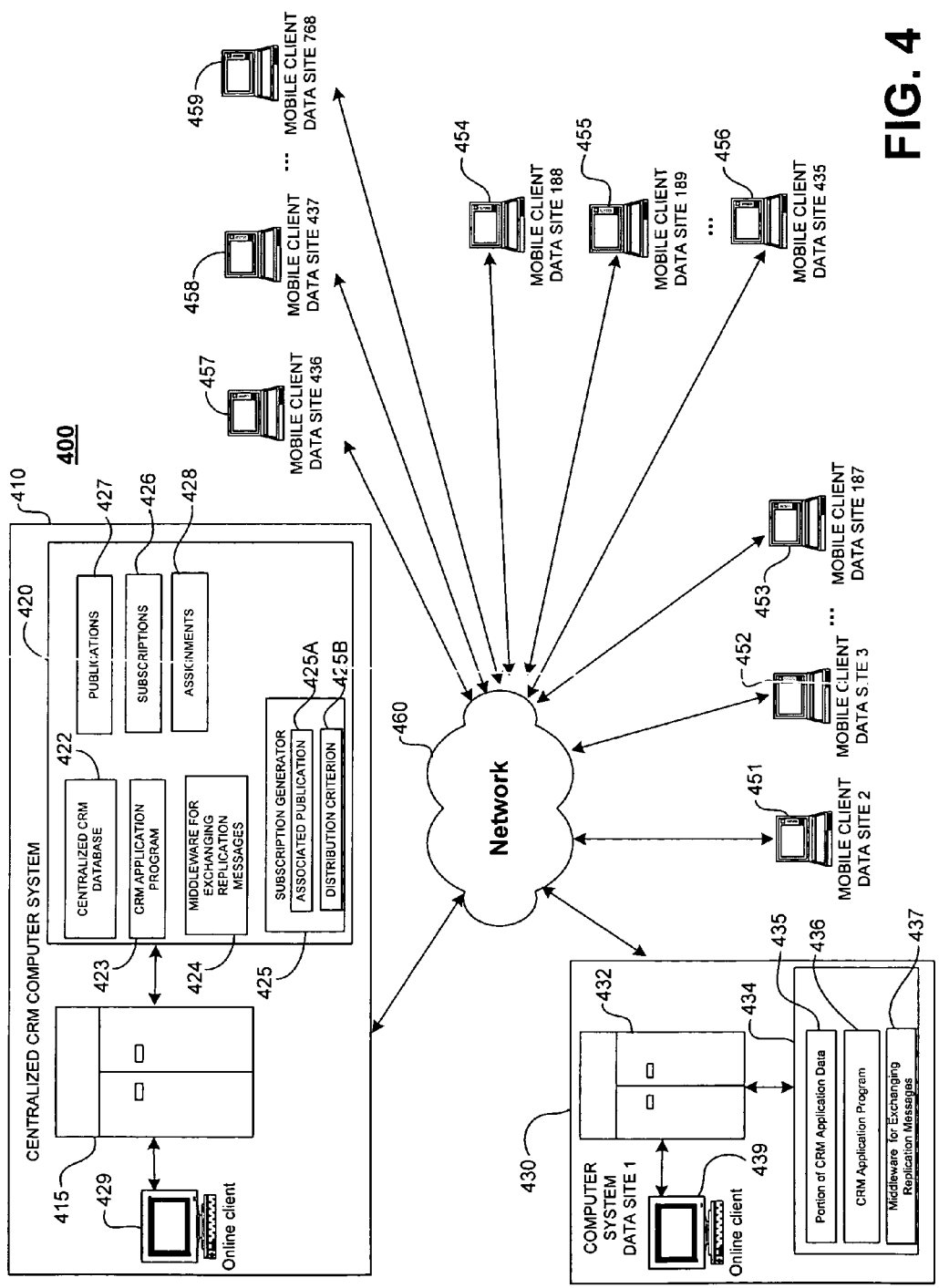
FIG. 4 is a block diagram of a customer relationship management system having a subscription generator.

FIGS. 4-7 use a particular implementation of a customer relationship management (CRM) system shown in FIG. 4 to illustrate a process for creating and using a subscription generator to manage the distribution of data to multiple, partially replicated data sites. The implementation of the CRM system 400 includes a centralized CRM computer system 410, a partially replicated CRM computer system 430, and multiple data sites on mobile clients 451-459. Each of the mobile clients 451-459 stores a partial version of the application data for use by the user of the CRM application program on the mobile client. For example, mobile client 451 may store data for a particular sales region, whereas mobile client 452 may store data for a different sales regions, and so on.

The centralized CRM system 410 includes a processor 415 connected, directly or indirectly, to data storage 420 for a centralized CRM database 422 that is used to store all of the CRM application data, a CRM application program 423, and middleware 424 for sending replication messages for use in transporting portions of application data to other data sites 430 and 451-459. The data storage 420 also includes a subscription generator 425 for generating subscriptions 426 to publications 427 of types of data and for generating assignments 428 of particular data sites of sites 430 and 451-459 to a particular subscription. The subscription generator 425 includes an association 425A to a particular publication of publications 427 and a distribution criteria 425B that defines the basis upon which the type of data identified by the associated publication is to be distributed. The subscription generator 425 also may be used for generating assignments of particular data sites 430 and 451-459 to particular employees. The centralized CRM system 410 also includes an online client 429 through which a user is able to access the CRM application program 423. For brevity, only one online client 429 of the centralized CRM system 410 is shown.

The partially replicated CRM computer system 430 includes a processor 432 connected, directly or indirectly, to data storage 434 for a portion 435 of CRM application data, a CRM application program 436, and middleware 437 for exchanging replication messages with the centralized CRM computer system 410. The partially replicated CRM computer system 430 also includes an online client 439 through which a user is able to access the CRM application program 436. For brevity, FIG. 4 only shows one online client 439 of the CRM computer system 430.

Each of the data sites 451-459 includes a CRM application program and a portion of CRM application data (not shown). The data sites 451-459 also include middleware (also not shown) for exchanging data replication messages with the centralized CRM computer system 410.

The centralized CRM computer system 410, the partially replicated CRM computer system 430, and the mobile clients 451-459 are arranged to operate within or in concert with one or more other communication networks 460. Examples of communication network 460 include, for example, one or more LANs ("Local Area Networks") and/or one or more WANs ("Wide Area Networks").

Figure 5:
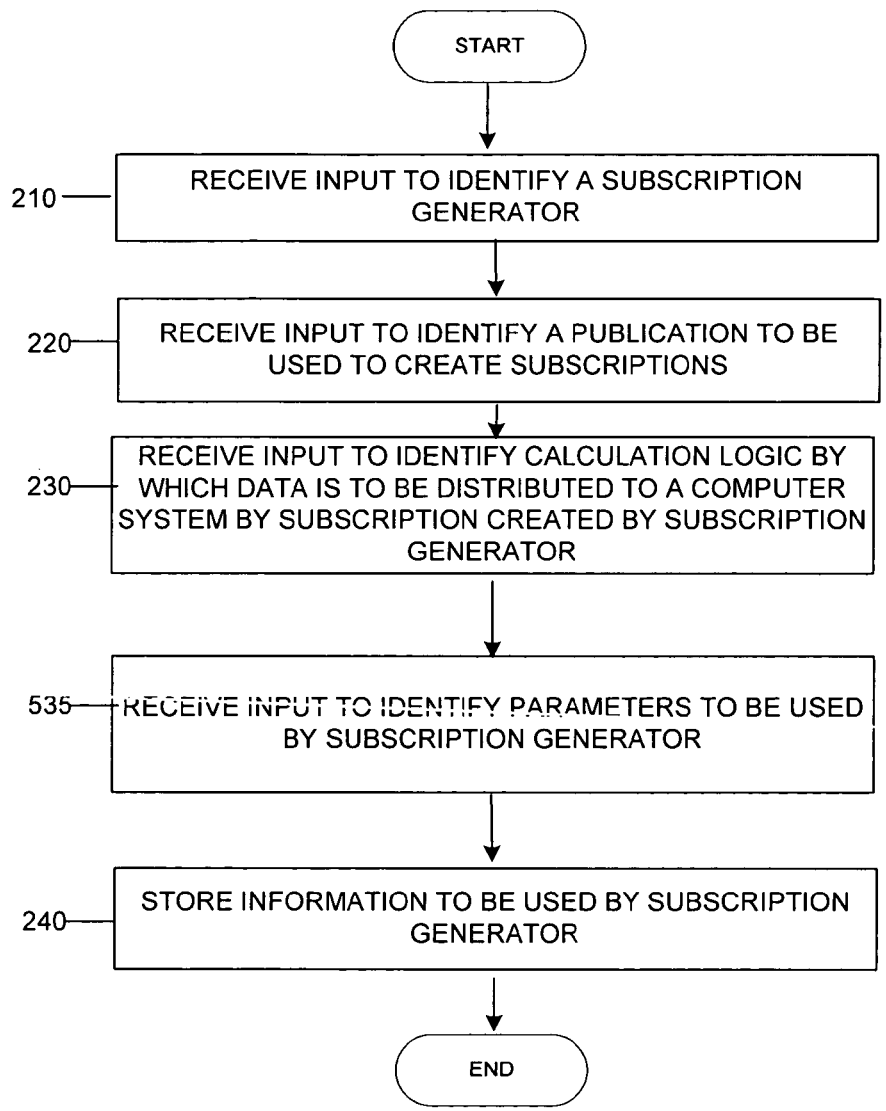
FIG. 5 is a flow chart of a process for creating a subscription generator for a customer relationship management system.

FIG. 5 illustrates a process 500 that is another example of a process for creating a subscription generator that may be used by the CRM system 400. The process 500 may be performed by the processor 415 on the centralized CRM computer system 410. As with process 200A in FIG. 2A, a system administrator or another type of user manually initiates and enters inputs for the process 500.

The process 500 begins by receiving input to identify a subscription generator (step 210), as described previously in FIG. 2. Another input is received that identifies a publication to be used to create subscriptions (step 220), and an input to identify calculation logic by which data is to be distributed (step 230), as described previously in FIG. 2A.

An input also is received that identifies generation parameters for controlling how the subscription generator operates (step 535). One example of a generation parameter is an indication whether a subscription should be generated only when the subscription is needed—that is, a subscription is not generated for an employee when the employee has not been assigned to any data site and data sites are not generated by the subscription generator (and, hence, the subscription to a non-existing data site for the employee to a non-existing data site is unnecessary). Another example of a generation parameter is an indication whether to exclude (or include) particular employees. In such a case, the subscription generator ignores the calculation logic and always (in the case of included particular employees) or never (in the case of excluded particular employees) creates a subscription based on an association between a specified employee and a data site. Another type of generation parameter indicates whether or not data sites should be generated. For example, when a data site has not been created for an employee that is using a mobile device, the subscription generator may also create the data site and assign the employee to the data site. In some implementations, the subscription generator also may receive input that identifies the values and attributes to use to create a particular data site. A generation parameter also may include an indication whether subscriptions are to be generated. This parameter enables the assignment of predefined subscriptions to particular data sites without permitting the automated generator of new subscriptions. Other generation parameters indicate settings that prohibit the deletion of generated data sites, generated subscriptions, or generated assignments. This capability may be advantageous when some data sites, subscriptions, and/or assignments of subscriptions to data sites may be manually created by user interaction and also automatically created by the subscription generator. For example, a user may be prohibited from inadvertently deleting a generated data site, a generated subscription or a generated assignment that the user did not recognize.

Other aspects of the subscription generator may be controlled, for example, through the use of scheduling parameters that define whether the subscription generator is active or inactive and a schedule for executing the subscription generator. The ability to define whether a subscription generator is active or inactive may be advantageous in a development environment in which a subscription generator could be defined without being activated so as not to harm operational data.

The processor then stores the information to be used by the created subscription generator (step 240), as described in FIG. 2A.

Figure 6:
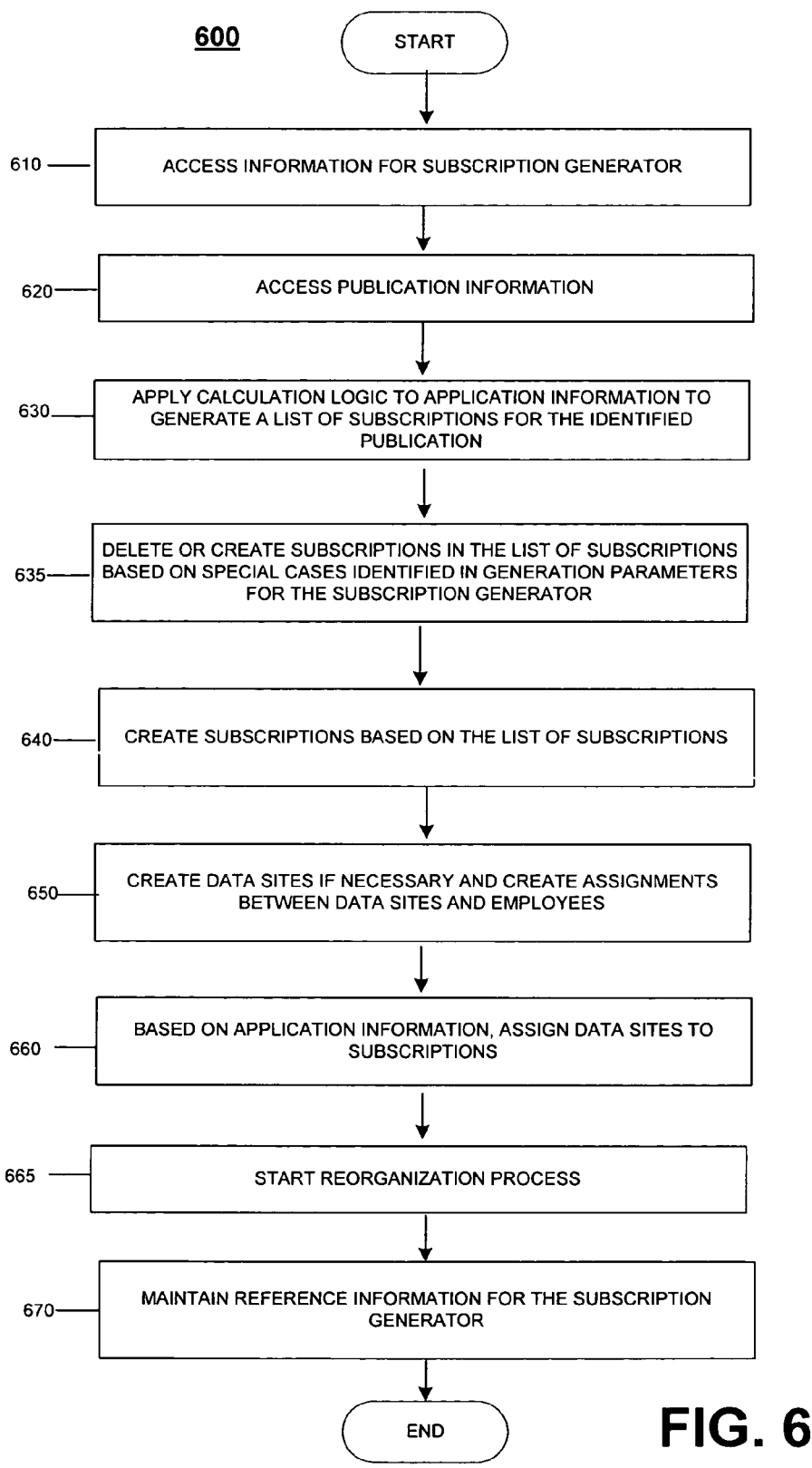
FIGS. 6 and 7 are flow charts of processes for using a subscription generator to generate subscriptions, data sites, assignments of data sites to subscriptions, and/or assignments of data sites to employees for a customer relationship management system.

FIG. 6 shows a process 600 for using a subscription generator to generate subscriptions and/or assignments of data sites to subscriptions. The process 600 may be performed by the processor 415 on the centralized CRM computer system 410. As with process 200B in FIG. 2B, the process 600 may begin at a predetermined time and date or may be manually initiated.

The process begins when the processor accesses information for the subscription generator (step 610), such as information 425A and 425B of the automated subscription generator 425 stored on the centralized CRM system 410 in FIG. 4. For brevity, the phrase "subscription generator" also may be used to refer to using information associated with a subscription generator to generate subscriptions. The processor also accesses publication information for the publication identified by the information for the subscription generator (step 620). An example of publication information is a publication in publications 427 stored on the centralized CRM system 410 in FIG. 4 that may be accessed based on the associated publication 425A of the subscription generator 425, also in FIG. 4.

The processor applies the calculation logic identified by the information in the subscription generator to application information, such as application information stored in the centralized CRM database 422 of the centralized CRM system 410, to generate a list of subscriptions for the identified publication (step 630). In some implementations, the calculation logic is used to determine the portions of application information that are accessed such that only application data relevant to the calculation logic is accessed.

The processor, based on generation parameters associated with the subscription generator, modifies the list of subscriptions to include additional employees or to exclude employees (step 635). This may be accomplished, for example, by adding an appropriate subscription to the list of subscriptions when a generation parameter indicates an employee is to be included. Similarly, when an employee is to be excluded from a particular subscription, the processor determines whether a subscription has been generated for the employee, and, if so, deletes the subscription from the list of subscriptions.

The processor then creates subscriptions based on the list of subscriptions generated in step 630 and modified in step 635 (step 640). To do so, the processor determines whether each subscription on the list of subscriptions exists and, if not, creates the needed subscriptions and assigns the subscriptions to the responsible data sites, as described previously. In some implementations, a previously existing subscription may be assigned to the responsible data site.

When generation parameters associated with the subscription generator indicate that data sites should be generated when necessary, missing data sites will be created and the processor creates the necessary assignments to the employees (step 660) and assigns, based on application information, these data sites to the subscriptions, as previously described (step 650).

The processor starts a reorganization process (step 665). The reorganization process helps to ensure that assignments, data sites and subscriptions that are no longer needed are deleted. For example, a previous run of a subscription generator may have created a subscription and assigned the subscription to data sites. When a subsequent run of the same subscription generator indicates that the subscription and the corresponding assignments of that subscription are no longer needed, the subscription and subscription assignments may be deleted during the reorganization process. The reorganization process also may trigger a replication process to distribute data to data sites as indicated by subscriptions.

The processor also maintains reference information for the subscription generator (step 670). For example, the processor may maintain reference information that indicates the data sites, assignments, and subscriptions created using in the process 600. Such reference information may be used to help ensure that reference information created by a subscription generator is not purposefully or inadvertently deleted by a system administrator or another user who is manually maintaining subscription, data site or assignment information. Similarly, such reference information may be used to help ensure that a subscription generator does not delete manually created subscriptions, data sites or assignments. The reference information also may enable the reorganization of information, such as subscriptions and assignments of subscriptions, created by a subscription generator, as described previously.

Figure 7:
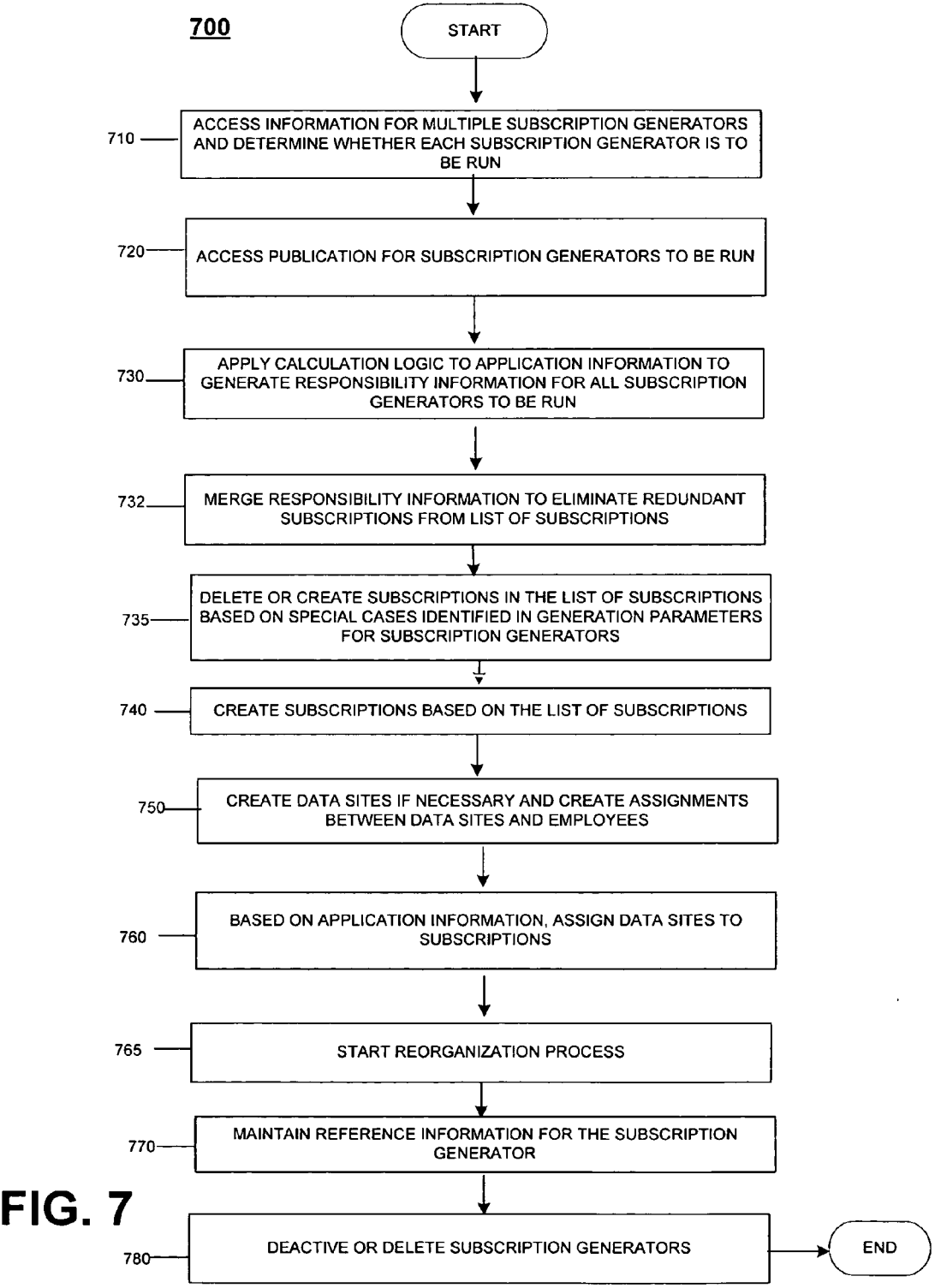

FIG. 7 shows another example of a process 700 for using a subscription generator to generate subscriptions and/or assignments. In the example of the process 700, subscriptions are generated based on application data identifying areas of responsibility for employees for which subscriptions are generated. The process 700 illustrates how multiple subscription generators may be activated and processed concurrently, which may result in a more efficient subscription generation process. The process 700 may be performed by the processor 415 on the centralized CRM computer system 410. As with process 200B in FIG. 2 and process 600 in FIG. 6, the process 700 may begin at a predetermined time and date or may be manually initiated by a user.

The process 700 begins when the processor accesses information for multiple subscription generators and determines whether each of the multiple subscription generators is to be included in the execution of the process (step 710). This may be referenced to as determining whether a subscription generator is, to be run. To determine whether a subscription generator is to be run, for example, the processor may determine whether a generation parameter of the subscription generator indicates that the subscription generator is only to be run every n times the process 700 is executed. For example, some subscription generators may only be run every seven times that the process 700 is executed, whereas another subscription generator may be run each time the process 700 is executed. This is another manner in which subscription generators may be scheduled. Typically, all subscription generators in a subscription generator repository are checked in step 710 each time process 700 is executed. In some implementations, however, a subset of the subscription generators may be identified and checked to determine whether each subscription generator of the identified subset is to be run.

The processor accesses publication information and application information for each of the subscription generators to be run (step 720). This may be accomplished in a similar manner as described previously in step 620 in FIG. 6.

The processor then applies the calculation logic to the application information 625 for each subscription generator to be run which results in a list of subscriptions (step 730). In particular, responsibility information that identifies employees for each subscription value is generated, based on application information, for all subscription generators run in process 700.

The processor then merges the responsibility information for each of the subscription generators to eliminate redundant subscriptions from the list of subscriptions (step 732). For example, two subscription generators each may identify a particular employee having responsibility for the same geographic location. In such a case, the processor may eliminate one of the two sets of identical responsibility information. This may help to avoid creating and using multiple redundant subscriptions, which in turn, may reduce the amount of network traffic used to distribute data to different computer systems. The processor, based on parameters associated with the subscription generator, modifies the list of subscriptions based on special cases identified in generation parameters for the subscription generators, such as by including additional employees or excluding employees regardless of the application data processed by the calculation logic of each subscription generator (step 735). This may be accomplished, for example, substantially similar to step 635 in FIG. 6.

The processor then creates subscriptions based on the list of subscriptions generated (step 740). When generation parameters associated with the subscription generator indicate that data sites should be generated when necessary, the processor assigns, based on application information, data sites to the subscriptions (step 750). Similarly, when the generation parameters associated with the subscription generator indicate data sites should be generated, the processor creates the data sites and the necessary assignments (step 760). The processor starts the reorganization process (step 765) and maintains reference information for the subscription generator (step 770). Some of all of the steps 740-770 may be accomplished substantially similar to steps 640-670 described in FIG. 6.

The processor then optionally deactivates or deletes subscription generators as indicated by generation parameters (step 780). For example, a generation parameter may indicate that a subscription generator is to be deactivated (that is, not run until the subscription generator is later activated, if ever) or deleted (that is, information about the subscription generator is to be deleted). In such a case, the processor may use reference information to identify and delete subscriptions, data sites, and assignments that result from the subscription generator to be deactivated or deleted and only result from that subscription generator.

The process 700 may result in a more efficient subscription generation process. For example, by merging responsibility information across different subscription generators, fewer unnecessary subscriptions may be generated because redundant subscriptions are not generated by different subscription generators.

In some implementations, a subscription generator also may be used to modify subscriptions and assignments in a reorganization of employee responsibilities or an organization structure often when employee responsibilities or organization structures change, data distribution changes, often substantially that results in different subscriptions, assignments and/or data sites. By way of example, when an employee responsibility changes from one region to another region, subscriptions for the employee (and, in turn, data site assigned to the employee) may change accordingly. In particular, the subscription generator deletes the assignment of the subscription to data related to the previously assigned region to the data site of the employee when no other employee assigned to the data site requires the subscription to data related to the previously assigned region. The subscription generator also creates a new assignment of the subscription to data related to the newly-assigned region to the data site of the employee unless another employee also assigned to the data site requires the subscription.

Although the techniques and concepts described in FIGS. 5-7 are described in the context of a CRM system, the techniques and concepts are applicable to other types of application programs, such as an enterprise resource management system, a human resources management system, a supply chain management system and a financial management system.

A number of implementations of the invention have been described. Nevertheless, it will be understood that various modifications may be made without departing from the spirit and scope of the invention. Accordingly, other implementations are within the scope of the following claims.

What is claimed is:

1. A computer-readable medium having embodied thereon a computer program configured to generate data subscriptions, the medium comprising one or more code segments configured to:

receive user input identifying a publication to be used to create data subscriptions, the publication being one of multiple predetermined publications identifying a type of data capable of being distributed to data sites;

receive user input identifying a distribution criterion by which data is to be distributed to data sites by subscriptions automatically generated without human intervention;

store, in computer-readable medium for later access, subscription-generation information including the identified publication and the identified distribution criterion;

access, using a first computer system, the subscription-generation information identifying the publication and the distribution criterion;

access, using the first computer system and the accessed subscription-generation information, application data of various data types, including the type of data identified by the subscription-generation information;

generate, using the first computer system, data subscriptions for the publication to be distributed to data sites corresponding to computer systems that are distinct from the first computer system, the computer systems and the first computer system being connected in a network of distributed computer systems operating an application program having the application data of the various data types, wherein each data subscription 1) is generated automatically by the first computer system based only on the type of data to be distributed to data sites, the accessed application data, and the distribution criterion and 2) identifies a portion of the application data to be distributed to one or more of the data sites of the second computer system;

generate assignments of data sites to the generated data subscriptions, the assignments being generated based on application data, using the first computer system, and automatically without human intervention;

store, in computer-readable medium for later access, the generated assignments; and distribute a portion of the application data to the data sites corresponding to computer systems, the distribution being based on the data subscriptions generated by the first computer system and the generated assignments.

2. The medium of claim 1 wherein the one or more code segments are further configured to:

access information related to data sites wherein the data site information includes attributes and attribute values associated with a particular data site; and associate a particular data site with a particular data subscription based on the data site information being related to the portion of application data to be distributed in the particular data subscription.

3. The medium of claim 1 wherein the type of data to be distributed to data sites comprises a business object type.

4. The medium of claim 1 wherein:

the distribution criterion comprises an attribute of the type of data to be distributed, and the generation of data subscriptions comprises generating data subscriptions wherein each data subscription is generated based on the attribute of the type of data to be distributed to data sites.

5. The medium of claim 1 wherein:

the distribution criterion comprises a distribution criterion based on a relationship of a portion of the application data with an employee that uses a data site, and the generation of data subscriptions comprises generating data subscriptions wherein each data subscription is generated based on the relationship of the portion of the application data with the employee that uses the data site.

6. A system for generating data subscriptions, the system comprising:

a central system having a central database storing application data of various data types for an application program, storing data subscriptions to receive portions of the application data and configured to assignments of data subscriptions to distributed systems such that each assignment identifies a particular data subscription and a particular distributed system that is to receive a portion of the type of application data that corresponds to the distribution criteria for the type of application data included in the data subscription; and distributed systems having local databases of which at least some local databases include different portions of the application data from the central database, wherein:

the data subscriptions for types of application program data are automatically generated by the central system based only on (1) the type of data to be distributed, the application data stored at the central system, and a distribution criteria for a type of application data, and (2) identifies a portion of the application data to be distributed to the local databases of the distributed systems, the assignments of data subscriptions are automatically generated based on the application data and the distribution criterion, and portions of the application data from the central database are distributed to the distributed systems based on the generated data subscriptions and assignments generated by the central system.

7. The system of claim 6 wherein the central system also stores assignments of employees to distributed systems such that each assignment identifies a particular employee and a particular distributed system that is to receive a portion of the type of application program data that corresponds to the particular employee based on the distribution criteria for the type of application program data included in the data subscription.

8. The system of claim 7 wherein assignments of employees are automatically generated based on (1) the application data and (2) the distribution criteria.

9. The system of claim 6 wherein the distribution criterion comprises an attribute of the type of data to be distributed.

10. The system of claim 6 wherein the distribution criterion comprises a distribution criterion based on a relationship of a portion of the application data with an employee that uses a data site.

11. A method for generating data subscriptions, the method comprising:

receiving user input identifying a publication to be used to create data subscriptions, the publication being one of multiple predetermined publications identifying a type of data capable of being distributed to data sites;

receiving user input identifying a distribution criterion by which data is to be distributed to data sites by subscriptions automatically generated without human intervention;

storing, in computer-readable medium for later access, subscription-generation information including the identified publication and the identified distribution criterion;

accessing, using a first computer system, the subscription-generation information identifying the publication and distribution criterion;

accessing, using the first computer system and the accessed subscription-generation information, application data of various data types, including the type of data identified by the subscription-generation information;

generating, using the first computer, data subscriptions for the publication to be distributed to data sites corresponding to computer systems that are distinct from the first computer system, the computer systems and the first computer system being connected in a network of distributed computer systems operating an application program having the application data of the various data types, wherein each data subscription 1) is generated automatically by the first computer system based only on the type of data to be distributed to data sites, the application data accessed at the first computer system, and the distribution criterion and 2) identifies a portion of the application data to be distributed to the data sites of the second computer system;

generating assignments of data sites to the generated data subscriptions, the assignments being generated based on application data, using the first computer system, and automatically without human intervention;

store, in computer-readable medium for later access, the generated assignments; and distributing a portion of the application data to the data sites corresponding to computer system, the distribution being based on the data subscriptions generated by the first computer system and the generated assignments.

12. The method of claim 11 further comprising:

accessing information related to data sites wherein the data site information includes attributes and attribute values associated with a particular data site; and associating a particular data site with a particular data subscription based on the data site information being related to the portion of application data to be distributed in the particular data subscription.

13. The method of claim 11 wherein the type of data to be distributed to data sites comprises a business object type.

14. The method of claim 11 wherein:

the distribution criterion comprises an attribute of the type of data to be distributed, and the generation of data subscriptions comprises generating data subscriptions wherein each data subscription is generated based on the attribute of the type of data to be distributed to data sites.

15. The method of claim 11 wherein:

the distribution criterion comprises a distribution criterion based on a relationship of a portion of the application data with an employee that uses a data site, and the generation of data subscriptions comprises generating data subscriptions wherein each data subscription is generated based on the relationship of the portion of the application data with the employee that uses the data site.

* * * * *